Nov. 15, 1927.  1,649,259
F. A. SCHMITZ
TAPPET CLEARANCE GAUGE
Original Filed Feb. 9, 1925
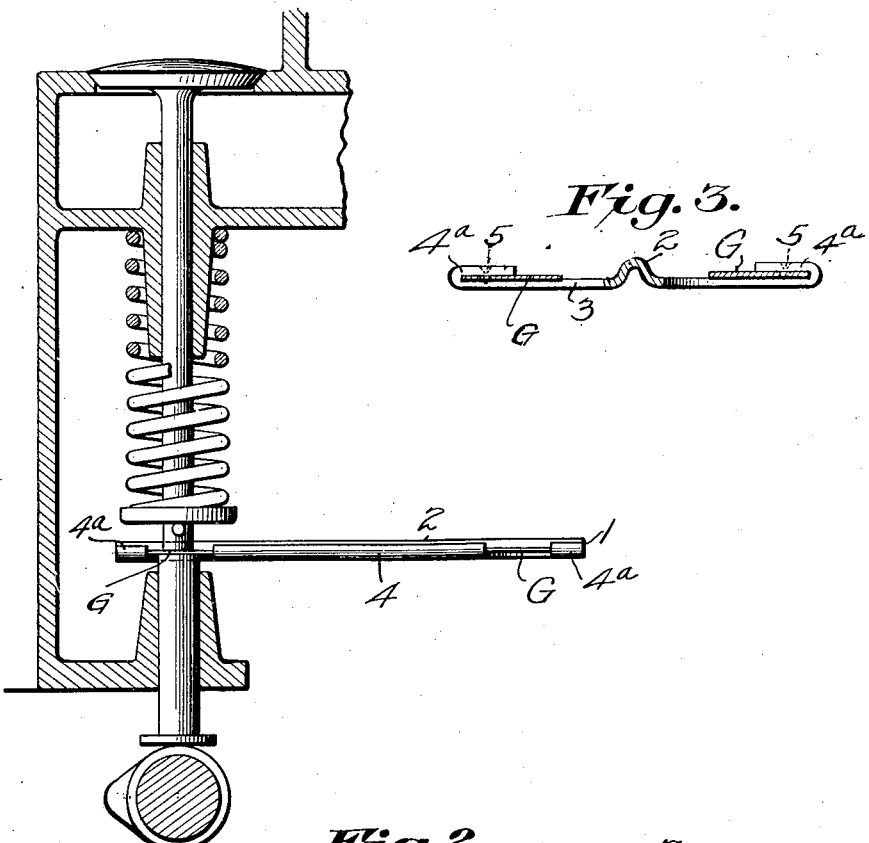
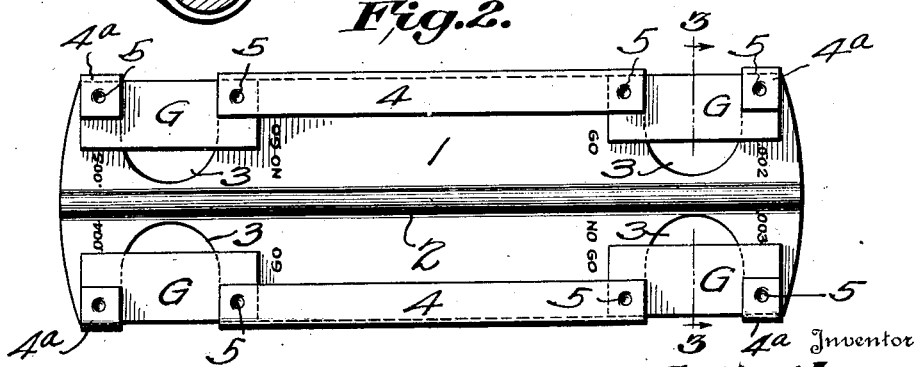
Inventor
Fred A. Schmitz, Patented Nov. 15, 1927.

1,649,259

UNITED STATES PATENT OFFICE.

FRED A. SCHMITZ, OF CLEVELAND, OHIO.

TAPPET-CLEARANCE GAUGE.

Application filed February 9, 1925, Serial No. 8,015. Renewed April 20, 1927.

This invention relates to a device for gauging the clearance between valve stems and their tappets, particularly, of the type used on internal combustion engines.

It is common practice and as a matter of fact necessary to have a proper amount of clearance or space between the tappets of an internal combustion engine and the ends of the valve stems to allow for expansion of the tappet shanks and valve stems so that the valve will be sure to close on the compression stroke of the motor. This clearance is usually given by manufacturers in thousandths of an inch and varies with the length and diameter of the tappets. Also, a different clearance is usually indicated for intake and exhaust valves, thereby making it necessary to have readily at hand a number of gauge elements of the proper dimensions, and as a rule mechanics use what is known as a feeler gauge. When using this type of gauge it is necessary to select the right leaf each time an adjustment is tried out, which makes the operation slow and often likely to be wrong, and furthermore, due to the thinness of some of the gauge leaves they are too long to be stiff enough to easily place between the end of the valve stem and its tappet.

Accordingly, the present invention has primarily in view the provision of a mechanic's accessory in the nature of a gauge having means for supporting thereon a plurality of gauge leaves so positioned and arranged that the mechanic may readily handle the same and accurately know what size gauge leaf he is using. In that connection it is proposed to use the gauge leaves in such a way that by reversing the body of the device, gauge leaves of the correct and maximum thickness may be readily available so that the mechanic will know whether he has enough clearance or too much clearance according to the particular valve being tested.

A further object of the invention is to provide a simple, inexpensive and substantial tool that combines accuracy and utility thereby affording convenience in manipulation, and expediting the work of the mechanic.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a sectional view of a valve stem and its cam operated tappet, illustrating the application of the invention.

Fig. 2 is a plan view of the device constituting the present invention.

Fig. 3 is a horizontal sectional view taken on the line 3—3 of Fig. 2.

Similar reference characters designate corresponding parts throughout the several figures of the drawings.

In the embodiment of the invention illustrated in the drawing the same preferably comprises a body, or body plate 1 having a central stiffening or reinforcing rib 2 and provided at the side edges thereof with a plurality of recesses or notches 3. These notches or cut-away portions are preferably arranged in pairs at opposite sides of the body plate and provide means whereby the gauge leaves G supported by the body may readily present an edge to the space or clearance between a valve stem and its tappet.

The said gauge leaves G may be held to the body at the locations of the cut-away portions by any suitable and convenient means, but as shown in the drawing, it is preferred to form the edges of the body plate 1 with inturned flanges 4 and 4ª which may be punched toward the body as indicated at 5 to clinch the ends of the gauge leaf in position.

The gauge leaves G are preferably made of thin steel and may be of any desired thickness. Usually motor manufacturers specify the clearance required between the tappets and valve stems in thousandths of an inch, and the particular gauge shown in the drawing is intended for use in connection with a motor which calls for .002" clearance for the intake and .004" clearance for the exhaust valves.

One of the novel features of the device resides in placing the gauge leaves G at opposite ends of the body plate in pairs in such a way that one of the gauge leaves will give the proper clearance while the opposite companion gauge will give the maximum thickness permissible or desired so that by merely reversing the body of the tool and fitting first one and then the other of the gauge leaves to the clearance, the mechanic can readily tell whether he has provided the proper clearance or too much clearance. In other words companion or complemental gauge leaves at one end of the device represent the correct and maximum thickness for a particular set of valves. For example, the gauge leaves G at the right hand end of the tool shown in the drawings are intended for use in connection with the intake valves of a motor calling for .002" clearance on the intake valves while the gauge leaves at the left hand end of the body are intended for use in connection with the exhaust valves of the motor calling for .004" clearance.

To assist the mechanic in using the tool the gauge of correct thickness has been designated "go" while the gauge of greater thickness indicating the maximum clearance desired has been designated "no go". Thus, in the case of the intake valves the "go" gauge represents .002" clearance while the "no go" gauge represents .003" clearance. The same relative dimensions apply in connection with the gauge leaves G for the exhaust valves at the other end of the body plate. In both cases it will be noticed that only .001" leeway is provided by the companion gauge leaves. In other words, the present gauge permits of adjusting the clearance to within .001".

In using the gauge the "go" gauge leaf would be tried first because that is the clearance desired while the "no go" is the secondary consideration so as to not get too much clearance which would rob the valve of its full lift and cause the tappets to be noisy. If the mechanic applies the "go" gauge and finds that the gauge leaf corresponding thereto fits between the end of the valve stem and the tappet and then reverses the tool to apply the "no go" gauge leaf and finds that it does not fit in the space provided, he then knows that the clearance is provided to within .001". If the "no go" gauge leaf should happen to fit in the space between the valve stem and the tappet the mechanic will know that too much clearance is provided and that he should grind down the valve further until the required adjustment is obtained.

It will of course be understood that the thickness of the gauge leaves may be readily varied as desired for different motors, and obviously the body plate 1 may carry as many gauge leaves as desired thereby to make the range of application of the tool as wide as desired.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A device for gauging the clearance between valve stems and their tappets including an elongated body plate, and a plurality of gauge leaves of different thickness arranged at opposite longitudinal edges of said body plate and adjacent the ends thereof.

2. A device for gauging the clearance between valve stems and their tappets including a body plate, and a plurality of gauge leaves of different thickness carried by the opposite edges of said plate, said leaves lying directly opposite at each edge of the body respectively representing correct and maximum clearance for a given valve stem.

3. A device for gauging the clearance between valve stems and their tappets including an elongated body plate reversible edge-for-edge and having gauge leaves of different thickness at the opposite longitudinal edges thereof and adjacent the ends thereof.

4. A device for gauging the clearance between valve stems and their tappets including an elongated body plate reversible edge-for-edge and having at opposite sides of each end thereof a pair of gauge leaves of different thickness respectively for the intake and exhaust valve stems of the motor.

5. A device for gauging the clearance between valve stems and their tappets including a body plate reversible edge-for-edge and having cut away portions in its edges, and clearance gauging leaves fastened to the body at said cut away portions.

6. A gauging device of the class described including an elongated body plate, and a plurality of relatively thin gauging leaves of different thickness fixedly supported at the edge of the plate thereby to enable the same to be fitted in the space between the stems and their tappets.

7. A device for gauging the clearance between valve stems and their tappets including a body plate having a plurality of notches opening at one edge thereof, gauge leaves of different thickness extending across the notches and flanges formed on the body plate for clamping said gauge leaves thereto.

8. A device for gauging the clearance between valve stems and their tappets including a body plate having a central reinforcing rib and having notches opening at the edges thereof and located in pairs at the ends, gauge leaves of different thickness extending across the notches, and flanges formed from the edge of the body plate and folded backwardly over the said body thereby to clamp the gauge leaves in position at the notches.

In testimony whereof I hereunto affix my signature.

FRED A. SCHMITZ.